(12) United States Patent  
Liu

(10) Patent No.: US 9,079,387 B2
(45) Date of Patent: Jul. 14, 2015

(54) METHOD FOR PREPARING COLOR MICROCAPSULE MEMBRANE AND DISPLAY COMPRISING SAME

(75) Inventor: Ze Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 168 days.

(21) Appl. No.: 13/700,977

(22) PCT Filed: Sep. 13, 2012

(86) PCT No.: PCT/CN2012/081361
§ 371 (c)(1),
(2), (4) Date: Nov. 29, 2012

(87) PCT Pub. No.: WO2013/075537
PCT Pub. Date: May 30, 2013

(65) Prior Publication Data
US 2013/0206316 A1 Aug. 15, 2013

(51) Int. Cl.
*B32B 37/02* (2006.01)
*B32B 37/14* (2006.01)
(Continued)

(52) U.S. Cl.
CPC ........... *B32B 37/24* (2013.01); *G02F 1/167* (2013.01); *B32B 37/02* (2013.01); *B32B 37/04* (2013.01);
(Continued)

(58) Field of Classification Search
CPC ..... G02F 1/167; G02F 1/17; Y10T 156/1052; Y10T 156/12; Y10T 156/1062; B32B 37/02; B32B 37/14; B32B 38/04; B32B 38/0004; B32B 2305/54; B32B 37/142; B32B 37/144

USPC .......... 156/256, 263, 264, 145, 146; 359/296; 345/107
See application file for complete search history.

(56) References Cited

U.S. PATENT DOCUMENTS 6,583,780 B1    6/2003   Kawai
2003/0021005 A1 1/2003   Liang et al.

FOREIGN PATENT DOCUMENTS

CN    201069507 Y   6/2008
CN    102629064 A   8/2012
(Continued)

OTHER PUBLICATIONS

Third Chinese Office Action Appln. No. 201110372085.2; Dated Oct. 10, 2014, 7 pages.
(Continued)

*Primary Examiner* — Linda L Gray
(74) *Attorney, Agent, or Firm* — Ladas & Parry LLP

(57) ABSTRACT

Embodiments of the invention disclose a method for preparing a color microcapsule electrophoresis display membrane by preparing individually various monochromatic microcapsule membranes, then binding each monochromatic microcapsule membrane together using a binding agent by stacking the membranes in sequence, so as to form multiple membrane layer units, and cutting the stacked multiple membrane layer units in a longitudinal direction perpendicular to a surface, thereby preparing the color microcapsule electrophoresis display membrane. The color microcapsule electrophoresis display membranes prepared by the method have high light reflectivity, high color contrast and precise color positioning. The invention further discloses a method for preparing a color microcapsule electrophoresis display comprising the color microcapsule electrophoresis display membrane.

12 Claims, 2 Drawing Sheets

(51) Int. Cl.
  *B32B 38/04* (2006.01)
  *G02F 1/17* (2006.01)
  *G02F 1/167* (2006.01)
  *B32B 37/24* (2006.01)
  *B32B 37/04* (2006.01)
  *B32B 38/00* (2006.01)

(52) U.S. Cl.
  CPC ............... *B32B 37/14* (2013.01); *B32B 37/142* (2013.01); *B32B 37/144* (2013.01); *B32B 38/0004* (2013.01); *B32B 2305/54* (2013.01); *G02F 1/17* (2013.01); *Y10T 156/1052* (2015.01); *Y10T 156/1062* (2015.01); *Y10T 156/12* (2015.01)

(56) References Cited

FOREIGN PATENT DOCUMENTS

| | | |
|---|---|---|
| JP | 2009-204793 A | 9/2009 |
| JP | 2009-251048 A | 10/2009 |

OTHER PUBLICATIONS

First Chinese Office Action dated Aug. 23, 2013; Appln. No. 201110372085.2.
Second Chinese Office Action dated Apr. 21, 2014; Appln. No. 201110372085.2
Korea Office Action—Examination Opinion dated Feb. 27, 2014; Appln. No. 10-2012-7030800.
International Search Report mailed Dec. 20, 2012; PCT/CN2012/081361.
International Preliminary Report on Patentability Issued May 27, 2014 Appln No. PCT/CN2012/081361.
First Chinese Office Action dated Aug. 23, 2013; Appln. No. 201110372085.2; 7 pages.
Second Chinese Office Action dated Apr. 21, 2014; Appln. No. 201110372085.2; 10 pages.
Korea Office Action—Examination Opinion dated Feb. 27, 2014; Appln. No. 10-2012-7030800; 7 pages.

METHOD FOR PREPARING COLOR MICROCAPSULE MEMBRANE AND DISPLAY COMPRISING SAME

CROSS REFERENCE TO RELATED APPLICATIONS

This application is a national stage application under 35 U.S.C. 371 and claims the benefit of PCT Application No. PCT/CN2012/081361 having an international filing date of Sep. 13, 2012, which designated the United States, which PCT application claimed the benefit of Chinese Application No. 201110372085.2 filed Nov. 21, 2011, the disclosure of each of which are incorporated herein by reference.

TECHNICAL FIELD

Embodiments of the invention relate to a method for preparing a color microcapsule electrophoresis display membrane and a color microcapsule electrophoresis display.

BACKGROUND

Electrophoresis display (EPD) technology has become one of the electronic display techniques that have great potential due to the combination of the advantages of usual paper and electronic displays. Electrophoresis display is usually bicolor, that is, only two different colors such as black-white, red-blue and the like can be displayed. Therefore, since development of color electrophoresis display not only can satisfy the demand for colorization, but also has great economic benefits, it will necessarily be the direction for future development of electrophoresis display.

Currently, methods for achieving the colorization of electrophoresis display include additional attaching color filter film, controlling the electrophoresis rate, and increasing sub-pixels.

The color filter method achieves color display by additionally attaching a layer of color filters on the surface of the upper transparent electrode substrate of a bicolor electrophoresis display, with black intervals between color filters to avoid color cross-talk. Although the color electrophoresis display thus formed has a high resolution, the color filters in this method causes a loss of about 70% of reflective light, which greatly affects the color saturation of images, resulting in a very dark display screen under conditions of weak light.

In the method of controlling electrophoresis rate, pigment particles of three different colors and having different Zeta potentials are suspended in a transparent electrophoresis solution, and the particles are conferred different electrophoresis rate by application of an electric potential, thereby achieving color display. It is relatively simple and convenient to prepare a color display with the method of controlling electrophoresis rate, but it is difficult to precisely control the Zeta potentials of the three pigment particles, resulting in the difficulty to achieve high contrast and brightness for the image.

The sub-pixel method utilizes microencapsulation techniques to encapsulate electrophoresis solution comprising three pigment particles of different colors (such as red, green and blue), respectively, to form microcapsules displaying different colors. Subsequently, with a radiation curing material as a binding agent, first microcapsules of one color (such as red microcapsules) are coated on a substrate with an electrode substrate formed upon, which is subject to selective ultraviolet light exposure curing with a photomask, and then the cured microcapsules are partly removed by a solvent that can dissolve the radiation curing material, therefore disposing the red microcapsules on specific positions on the substrate comprising electrode plates. By repeating the aforementioned steps, the green and blue microcapsules can be arranged on the electrode plates in an orderly manner. For the prepared display, color display can be achieved by adjusting the electric potentials across the electrode plates. Although a good display effect can be obtained, this microcapsule coating process is complicated, requires repeated exposure processes and solvent soaking processes, which greatly damage the microcapsules, and has a low yield.

US Patent Application US 20030021005 disclosed an electrophoresis display with color filters. Although this technique can realize colorization, it reduces the light reflectivity of the display, which affects the display effect.

Although colorization is enabled by the technical means of disposing color filters on the microcapsules, the light has to pass through in and out the color filters and the microcapsules during incidence and reflection, that is, the light has to pass through four membrane layers. Therefore, the light loss is great. The light reflectivity is reduced to 35%, even down to 20%. When light is weak, the shade contrast is significantly reduced.

U.S. Pat. No. 6,583,780 disclosed an implementation of a color microcapsule electrophoresis display. This technique primarily employs the method of photolithography technology, which requires repeated etching operations and thus is complicated, hard to control, and has low maneuverability. Meanwhile, the etching causes great damages on the microcapsules and it is difficult to ensure the quality of the microcapsules and the display effect of the display.

SUMMARY

One of the technical problems to be solved by the embodiments of the invention is how to increase the light reflectivity of a color microcapsule electrophoresis display.

One embodiment of the invention provides a method for preparing a color microcapsule electrophoresis display membrane by preparing individually various monochromatic microcapsule membranes, then binding each monochromatic microcapsule membrane together using a binding agent by stacking the membranes in sequence, so as to form multiple membrane layer units, and cutting the stacked multiple membrane layer units in a longitudinal direction perpendicular to a surface, thereby obtaining the color microcapsule electrophoresis display membrane.

In one embodiment of the invention, the method for preparing a color microcapsule electrophoresis display membrane comprising steps of:

1) individually preparing red, green, blue and black monochromatic electrophoresis dispersions comprising white charged particles;

2) individually encapsulating the monochromatic electrophoresis dispersions thus obtained to form monochromatic microcapsule display particles, for example, the aforementioned encapsulation can be implemented by complex coacervation or in-situ polymerization;

3) individually mixing the monochromatic electrophoresis display particles with an adhesive, so as to individually prepare monochromatic electrophoresis display membranes; and 4) binding the monochromatic microcapsule membranes together with a binding agent by stacking the membranes in sequence so as to form stacked multiple membrane layer units.

In one example, the complex coacervation refers to the process that employs two reversely charged wall substances as cladding materials, and after a core material is disposed therein, allowed the two wall substances to interact by changing pH, temperature or aqueous solution concentration of the system to form a complex, resulting in the reduction of solubility and coagulation and precipitation, thereby forming microcapsules.

In one example, the in-situ polymerization refers to a process of forming a water soluble prepolymer between urea and formaldehyde under alkaline conditions; then emulsifying and dispersing the electrophoresis solution in the prepolymer; adjusting pH of the solution to acidic; further eliminating small molecules (water and the like) between the prepolymer molecules to form a water insoluble polycondensate with crosslinked spatial reticular structure; and forming microcapsules by encapsulation of capsule cores.

In one example, in the prepared monochromatic microcapsule electrophoresis display membranes, the arrangement of the microcapsules are orderly, and the thickness of the membrane is the smaller the better. A preferred thickness is 1 to 3 microcapsule particle diameters, and a more preferred thickness is 1 microcapsule particle diameter.

In one example, the monochromatic microcapsule electrophoresis display membranes are bound by stacking in sequence of colors, and after the stacked layers are longitudinally cut, different colors are regularly displayed in sequence on the cross-section, thereby realizing the colorization of the microcapsule electrophoresis display. Moreover, the longitudinal cutting can make the cross-section regular so as to achieve the technical effect of precise contraposition.

In one example, the adhesive may be selected from one of water soluble alkyd resin, water soluble epoxy ester resin and alkyl acrylate co-polymer dispersed emulsion.

In one example, the binding agent may be selected from aqueous binding agents and solvent type binding agents, including, but not limited to, acrylic resin type (such as methyl acrylate), aqueous polyurethane type, vinyl acetate resin type or epoxy resin type binding agents.

In one example, a size for the longitudinal cutting is 1 to 10 microcapsule particle diameters; preferably, the size for the longitudinal cutting is 1 to 5 microcapsule particle diameters; and more preferably, the size for the longitudinal cutting is 1 to 3 microcapsule particle diameters.

In one example, the microcapsule particle diameter is 10-100 µm; preferably, the microcapsule particle diameter is 20-50 µm; and more preferably, the microcapsule particle diameter is 20-30 µm.

Another embodiment of the invention also provides a method for preparing a color microcapsule electrophoresis display comprising the steps of: cutting the color microcapsule electrophoresis display membrane prepared by the aforementioned method according to a required size and specification; and sticking the color microcapsule electrophoresis display membrane after cutting to a backplane to form the color microcapsule electrophoresis display.

In one example, the adhesive may be selected from one of water soluble alkyd resin, water soluble epoxy ester resin and alkyl acrylate co-polymer dispersed emulsion.

In one example, the binding agent may be selected from aqueous binding agents and solvent type binding agents, including, but not limited to, acrylic resin type (such as methyl acrylate), aqueous polyurethane type, vinyl acetate resin type or epoxy resin type binding agents.

In one example, a size for the longitudinal cutting is 1 to 10 microcapsule particle diameters; preferably, the size for the longitudinal cutting is 1 to 5 microcapsule particle diameters; and more preferably, the size for the longitudinal cutting is 1 to 3 microcapsule particle diameters.

In one example, the microcapsule particle diameter is 10-100 µm; preferably, the microcapsule particle diameter is 20-50 µm; and more preferably, the microcapsule particle diameter is 20-30 µm.

The embodiments of the invention first individually prepare various monochromatic microcapsule electrophoresis display membranes, and then the various monochromatic membranes are bound by stacking according to the requirements of color display. The technical effect of simple preparation of a color microcapsule electrophoresis display membrane is achieved by the technical means of longitudinal cutting.

BRIEF DESCRIPTION OF THE DRAWINGS

In order to more clearly illustrate the technical solutions of the embodiments of the invention, the figures of the embodiments are briefly introduced below. Apparently, the figures in the following description merely concern some embodiments of the invention, rather than limit the invention.

Figure 1:
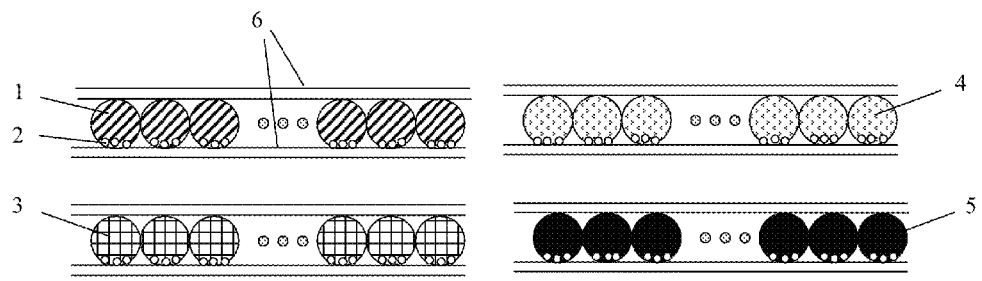
FIG. 1 is a diagram of the monochromatic microcapsule electrophoresis display membrane.

1: blue microcapsule display particles;
2: white charged particles;
3: red microcapsule display particles;
4: green microcapsule display particles;
5: black microcapsule display particles;
6: binding agents;
M: the transversal size of the monochromatic microcapsule display membrane;
N: the number of the longitudinal membrane layer units of the monochromatic microcapsule display membrane.
M and N are both integers more than 1.

DETAILED DESCRIPTION

In order to more clearly demonstrate the purpose, technical solutions and advantages of the embodiment of the invention, the technical solutions of the embodiments of the invention is clearly and fully described below in light of the figures of the embodiments of the invention. Apparently, the described embodiments are merely some rather than all embodiments of the invention. Any other embodiment obtainable by a person of ordinary skill in the art on the basis of the described embodiments of the invention, without resorting to creative labor, falls into the scope of the invention.

Example 1

1) Preparation of Titanium Dioxide Microspheres Coated by Polystyrene 2.0 g titanium dioxide (TiO2) modified by methacryloxypropyl dimethoxysilane (MPS), 50 g absolute ethanol, 6 g styrene monomer and 0.2 g benzoyl peroxide (BPO) initiator are reacted under magnetic agitation for 18 hours (h) at 78 centigrade (° C.) under nitrogen ($N_2$) atmosphere. The products are centrifuged and dried followed by refluxing in toluene, centrifugation and extraction. The process is repeated multiple times, until no characteristic absorption of polystyrene is observed in FIR of the centrifuged and extracted solution, thereby obtaining titanium dioxide microspheres coated by polystyrene.

2) Preparation of Electronic Ink Microcapsules 0.8 g titanium dioxide microspheres coated by polystyrene and 0.08 g Solvent Green 3 are dispersed in a mixed solvent of 20 ml perchlorethylene and 5 ml xylene and dispersed under ultrasound wave at 50° C. for 60 minutes (min) to obtain an electrophoresis suspension. 30 g electrophoresis suspension is dispersed in a solution of 100 g hydrolyzed styrene-maleic anhydride copolymer (with a mass fraction of 3%). Under the conditions that the system temperature is maintained at 55° C. and the agitation is 900 r/min, the equal amount of gelatin aqueous solution having a mass fraction of 3% is added; pH is adjusted to 4.3 by adding acetic acid with a mass fraction of 10%, so that a complex coacervation reaction occurs. The system temperature is lowered to 10° C., and glutaraldehyde aqueous solution with a mass fraction of 10% is added to make the gelatin crosslinked. Then the agitation is continued for 10 h to obtain green microcapsule display particles comprising white charged particles. The particle diameter of the microcapsules is 25±1 µm.

Red, blue and black microcapsule display particles comprising white charged particles (titanium dioxide particles) are prepared by the same method as the aforementioned by employing Oil Red 101, Oil Blue 501 and Oil Black 601.

3) An adhesive, water soluble alkyd resin, is mixed with the individual monochromatic microcapsule display particles, respectively, so as to obtain the individual monochromatic microcapsule electrophoresis display membranes. As shown in FIG. 1, the thickness of the membrane in the direction perpendicular to the surface is 1 microcapsule particle diameter.

Figure 2:
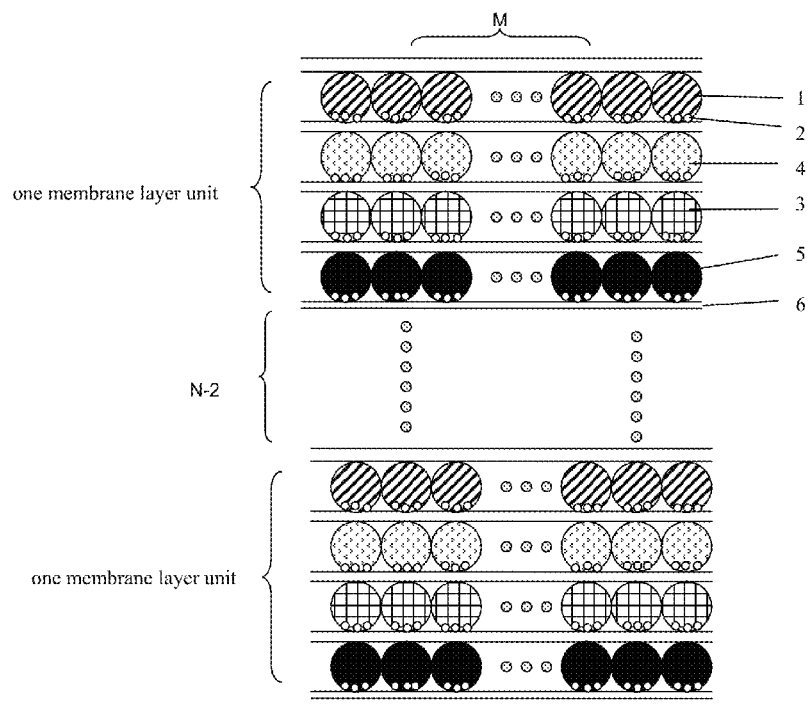
FIG. 2 is a diagram of sticking the monochromatic microcapsule electrophoresis display membranes.

4) The individual monochromatic microcapsule electrophoresis display membranes are bound together with a binding agent, methyl acrylate, by stacking in the horizontal direction in the sequence of blue, green, red and black color, to be a membrane layer unit. These steps are repeated multiple times to form N membrane layer units, as shown in FIG. 2. Subsequently, in FIG. 2, the N membrane layer units thus obtained are cut in the longitudinal direction perpendicular to the horizontal direction (that is, the surface of the membrane layers), and the size for the longitudinal cutting is, for example, 3 microcapsule particle diameters. The transversal size of the monochromatic microcapsule electrophoresis display membrane of each color is, for example, M microcapsule particle diameters.

Figure 3:
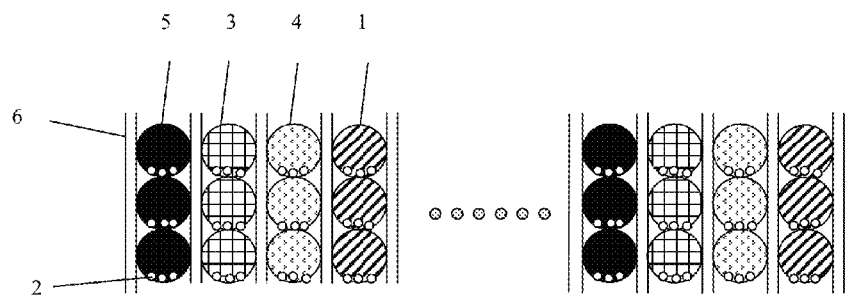
FIG. 3 is a diagram of the color microcapsule membrane formed by longitudinal cutting of the multiple layers of monochromatic microcapsule electrophoresis display membranes stuck together; that is, a diagram of the monochromatic microcapsule electrophoresis display membranes which are stuck together and then longitudinally cut, followed by a 90° rotation.

An individual color microcapsule electrophoresis display membrane is obtained by rotation following the cutting, as shown in FIG. 3. This color microcapsule electrophoresis display membrane has a thickness of 3 microcapsule particle diameters along the vertical direction in FIG. 3, and N microcapsule particle diameters along the horizontal direction. The adjacent blue, green, red and black monochromatic microcapsules, for example, each individually corresponding to one sub-pixel, correspond to a pixel unit as a whole.

5) The color microcapsule electrophoresis display membrane obtained in step 4) is cut according to a required size and specification.

Figure 4:
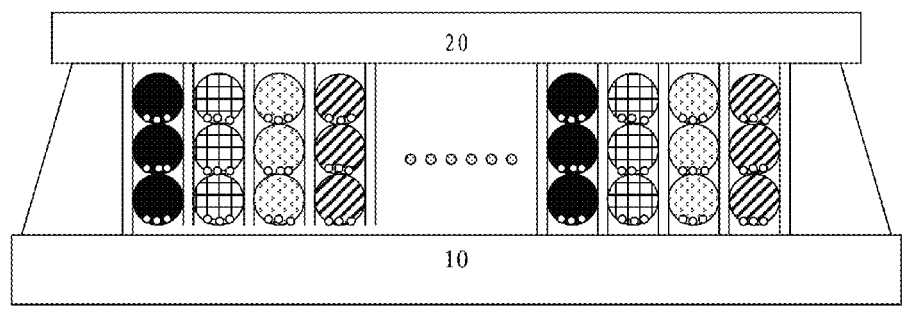
FIG. 4 is a diagram of a color microcapsule electrophoresis display comprising the color microcapsule electrophoresis display membrane.

6) The color microcapsule electrophoresis display membrane after cutting is stuck to a backplane 10 comprising an electric circuit device, and attached with a protection membrane 20 thereon, thereby obtaining a color microcapsule electrophoresis display (as shown in FIG. 4).

The backplane 10 may be prepared by using any of known methods. Moreover, this electric circuit device is, for example, an active driving circuit or a passive driving circuit. The active driving circuit is, for example, a film transistor serving as a switch element. In this case, the microcapsules for individual sub-pixels need to be aligned and correlated with the driving circuits for the individual sub-pixels on the backplane.

The protection membrane 20 is for example a glass sheet or an organic film, such as a polyethylene (PE) film, a polypropylene (PP) film or the like.

The embodiments of the invention are not limited to monochromatic microcapsules merely of blue, green, red and black colors. Other color patterns can also be adopted.

Example 2

1) Preparation of Titanium Dioxide Microspheres Coated by Polyvinyl Alcohol 100 mg titanium dioxide is dispersed in 100 ml water in which 35 mg polyvinyl alcohol is dissolved, with agitation for 30 min. 500 ml ethanol is added into the aforementioned system. After filtration, the solution is slowly added dropwise into 1000 ml perchlorethylene, so that the polyvinyl alcohol, which is insoluble to the perchlorethylene, is slowly encapsulated onto the surface of the titanium dioxide to form a modification layer, and the product is separated out as precipitates. 0.8 g titanium dioxide microspheres encapsulated by polyvinyl alcohol and 0.08 g Solvent Red 149 are dispersed in a mixed solvent of 20 ml perchlorethylene and 5 ml xylene and dispersed under ultrasound wave at 50° C. for 60 min to obtain an electrophoresis suspension.

2) Preparation of Electronic Ink Microcapsules 0.5 g urea is used and dissolved in 1.4 ml 37% formaldehyde aqueous solution. Triethanolamine is added to adjust pH=8.5. Reaction is conducted at 80° C. for 1 h to produce prepolymer. On the other hand, 25 ml water is used and added with 48 mg OP-10 emulsifying agent and 10 mg sodium dodecyl sulfate with agitation to dissolution; then 3 ml electrophoresis suspension prepared in step 1) is added and rigorously agitated under room temperature for 45 min to prepare an emulsion, followed by the addition of the prepolymer. pH is adjusted to 3.5 with 3% HCl aqueous solution; then the reaction is conducted at 70±5° C. for 3 h, obtaining red microcapsules with a diameter of 25±15 µm.

Green, blue and black microcapsule display particles comprising white charged particles (titanium dioxide particles) are prepared by the same method as the aforementioned with Solvent Green 7, Oil Blue 122 and Oil Black 601.

3) An adhesive, water soluble epoxy ester resin, is mixed with the individual monochromatic microcapsule display particles, respectively, to obtain the individual monochromatic microcapsule electrophoresis display membranes. The thickness of the membranes in the direction perpendicular to the horizontal direction is 2 microcapsule particle diameters.

4) The individual monochromatic microcapsule electrophoresis display membranes are bound together with a binding agent, aqueous polyurethane, by stacking in the sequence of blue, green, red and black colors, to be a membrane layer unit. These steps are repeated multiple times to form multiple (for example N1) membrane layer units. Subsequently, the stacked layers of multiple membrane layer units thus obtained are cut in the direction perpendicular to the surface of the membrane layers (longitudinally), and the size for the longitudinal cutting is, for example, 5 microcapsule particle diameters. A color microcapsule electrophoresis display membrane is obtained by rotation following the cutting. This color microcapsule electrophoresis display membrane has a thickness of 5 microcapsule particle diameters along the direction perpendicular to the surface, and N1 microcapsule particle diameters along the horizontal direction. The adjacent blue, green, red and black monochromatic microcapsules, for example, each individually corresponding to one sub-pixel, correspond to a pixel unit as a whole.

5) The color microcapsule electrophoresis display membrane obtained in step 4) is cut according to a required size and specification.

6) The color microcapsule electrophoresis display membrane after cutting is stuck to a backplane comprising an electric circuit device, and attached with a protection membrane thereon, thereby obtaining a color microcapsule electrophoresis display.

The backplane may be prepared by using any of known methods. Moreover, this electric circuit device is, for example, an active driving circuit or a passive driving circuit. The active driving circuit is, for example, a film transistor serving as a switch element. In this case, the microcapsules for individual sub-pixel need to be aligned and correlated with the driving circuit for the individual sub-pixel on the backplane.

The protection membrane 20 is for example a glass sheet or an organic film, such as a polyethylene (PE) film, a polypropylene (PP) film or the like.

The embodiments of the invention are not limited to monochromatic microcapsules merely of blue, green, red and black color. Other color patterns can also be adopted.

Example 3

1) Preparation of Titanium Dioxide Microspheres with Stearic Acid Surface Modification 50 g titanium dioxide is dispersed in 200 ml toluene solution of stearic acid in a weight percentage concentration of 3%, followed by heating to 100° C. with agitation within 20 min. The temperature is kept constant for 1 h, and filtration is conducted in the condition of being hot, followed by repeated washing with n-hexane. The modified titanium dioxide microspheres are obtained after drying in a dryer at 50° C.

2) Preparation of Electronic Ink Microcapsules 1.0 g titanium dioxide microspheres after surface modification and 0.1 g Oil Black 601 are dispersed in a mixed solvent of 25 ml perchlorethylene and 5 ml xylene and dispersed under ultrasound wave at 50° C. for 70 min to obtain an electrophoresis suspension. 30 g electrophoresis suspension is dispersed in a solution of 100 g hydrolyzed styrene-maleic anhydride copolymer (with a mass fraction of 3%). Under the conditions that the system temperature is maintained at 60° C. and the agitation is 900 r/min, the equal amount of gelatin aqueous solution having a mass fraction of 3% is added; pH is adjusted to 4.5 by adding acetic acid with a mass fraction of 10%, so that a complex coacervation reaction occurs. The system temperature is lowered to 10° C., and glutaraldehyde aqueous solution with a mass fraction of 10% is added to make the gelatin crosslinked. Then the agitation is continued for 12 h to obtain black microcapsule display particles comprising white charged particles. The particle diameter of the microcapsules is 30±10 μm.

Red, blue and green microcapsule display particles comprising white charged particles (titanium dioxide particles) are prepared by the same method as the aforementioned by employing Oil Red G, Oil Blue 59 and Oil Green 402.

3) An adhesive, alkyl acrylate dispersed emulsion, is mixed with the individual monochromatic microcapsule display particles, respectively, so as to obtain the individual monochromatic microcapsule electrophoresis display membranes. The thickness of the membranes in the direction perpendicular to the surface is 3 microcapsule particle diameters.

4) The individual monochromatic microcapsule electrophoresis display membranes are bound together using a binding agent, vinyl acetate resin, by stacking in the sequence of blue, green, red and black color, to be a membrane layer unit. These steps are repeated multiple times to form multiple (for example, N2) membrane layer units. Subsequently, the multiple membrane layer units thus obtained are cut in the direction perpendicular to the surface of the membrane layers (longitudinally), and the size for the longitudinal cutting is, for example, 3 microcapsule particle diameters. A color microcapsule electrophoresis display membrane is obtained by rotation following the cutting. This color microcapsule electrophoresis display membrane has a thickness of 3 microcapsule particle diameters in the direction perpendicular to the surface, and N2 microcapsule particle diameters along the horizontal direction. The adjacent blue, green, red and black monochromatic microcapsules, for example, each individually corresponding to one sub-pixel, correspond to a pixel unit as a whole.

5) The color microcapsule electrophoresis display membrane obtained in step 4) is cut off according to a required size and specification.

6) The color microcapsule electrophoresis display membrane after cutting is stuck to a backplane comprising an electric circuit device, and attached with a protection membrane, thereby obtaining a color microcapsule electrophoresis display.

The backplane may be prepared by using any of known methods. Moreover, this electric circuit device is for example, an active driving circuit or a passive driving circuit. The active driving circuit is, for example, a film transistor serving as a switch element. In this case, the microcapsules for individual sub-pixel need to be aligned and correlated with the driving circuit for the individual sub-pixel on the backplane.

The protection membrane 20 is for example a glass sheet or an organic film, such as a polyethylene (PE) film, a polypropylene (PP) film or the like.

The embodiments of the invention are not limited to monochromatic microcapsules merely of blue, green, red and black colors. Other color patterns can also be adopted.

The microcapsule particles of the embodiments of the invention are white, while the electrophoresis dispersion is colored. Therefore, light only needs to pass through the membrane twice during the incidence and reflection through the membrane, which reduces light loss, resulting in brighter colors of the membrane and high light and shade contrast ratio. Therefore, compared with a light source, the color microcapsule membranes obtained by the methods of the invention cause little or no reduction of light reflectivity, thereby improving the display effect. Compared with microcapsules coated with color filters, the color microcapsule membranes obtained by the methods of the invention have greatly higher light reflectivity. Compared with the method of photolithography, the methods of the invention have a simple and controllable process which is easy to maneuver, thereby avoiding the damages caused by repeated etching operations to the microcapsules during the photolithography process.

The color microcapsule electrophoresis display membranes prepared by the method have advantages of high light reflectivity, high color contrast and precise color positioning, thereby improving the current color microcapsule electrophoresis display which has the issues of low light reflectivity and low color contrast. Moreover, it features simple processes of preparation and enables industrial mass production.

To a person of ordinary skill in the art, various changes and improvements may be made without departing from the spirits and essence of the invention, and these changes and improvements are also considered as within the scope of protection of the invention.

The invention claimed is:

1. A method for preparing a color microcapsule electrophoresis display membrane comprising:
    preparing individually multiple monochromatic microcapsule membranes, then binding each monochromatic microcapsule membrane together using a binding agent by stacking the membranes in sequence, so as to form multiple membrane layer units, and cutting the stacked multiple membrane layer units in a longitudinal direction perpendicular to a surface of the stacked multiple membrane layer units, thereby obtaining the color microcapsule electrophoresis display membrane with a membrane surface being produced in the cutting in the longitudinal direction.

2. The method according to claim 1, comprising steps of:
   1) individually preparing colored monochromatic electrophoresis dispersions comprising white charged particles;
   2) individually encapsulating the obtained monochromatic electrophoresis dispersions to form monochromatic microcapsule display particles;
   3) individually mixing the monochromatic electrophoresis display particles with an adhesive so as to prepare monochromatic electrophoresis display membranes; and
   4) binding the monochromatic microcapsule membranes together with a binding agent by stacking the membranes in sequence so as to form stacked multiple membrane layer units.

3. The method according to claim 2, wherein the adhesive is selected from one of water soluble alkyd resin, water soluble epoxy ester resin, and alkyl acrylate co-polymer dispersed emulsion.

4. The method according to claim 1, wherein the binding agent is selected from one of acrylic resin, aqueous polyurethane, vinyl acetate resin, and epoxy resin binding agents.

5. The method according to claim 1, wherein a size for the longitudinal cutting is 1 to 10 microcapsule particle diameters.

6. The method according to claim 5, wherein the size for the longitudinal cutting is 1 to 5 microcapsule particle diameters.

7. The method according to claim 6, wherein the size for the longitudinal cutting is 1 to 3 microcapsule particle diameters.

8. The method according to claim 1, wherein the microcapsule particle diameter is 10-100 µm.

9. The method according to claim 8, wherein the microcapsule particle diameter is 20-50 µm.

10. The method according to claim 1, wherein the color includes red, green, blue and black.

11. A method for preparing a color microcapsule electrophoresis display comprising steps of:
    cutting the color microcapsule electrophoresis display membrane prepared by the method according to claim 1 according to a required size and specification; and
    sticking the color microcapsule electrophoresis display membrane after cutting to a backplane to form the color r aicrocapsule electrophoresis display.

12. The method according to claim 9, wherein the microcapsule particle diameter is 20-30 µm.

* * * * *